US009390034B1

(12) United States Patent
Fair

(10) Patent No.: US 9,390,034 B1
(45) Date of Patent: Jul. 12, 2016

(54) UNIFIED SCSI TARGET MANAGEMENT FOR PERFORMING A DELAYED SHUTDOWN OF A SERVICE DAEMON IN A DEDUPLICATION APPLIANCE

(71) Applicant: EMC Corporation, Hopkinton, MA (US)

(72) Inventor: Robert L. Fair, Cary, NC (US)

(73) Assignee: EMC Corporation, Hopkinton, MA (US)

( * ) Notice: Subject to any disclaimer, the term of this patent is extended or adjusted under 35 U.S.C. 154(b) by 457 days.

(21) Appl. No.: 13/929,639

(22) Filed: Jun. 27, 2013

(51) Int. Cl.
G06F 13/14 (2006.01)
G06F 15/177 (2006.01)

(52) U.S. Cl.
CPC .............. *G06F 13/14* (2013.01); *G06F 15/177* (2013.01)

(58) Field of Classification Search
CPC ................................ G06F 15/177; G06F 13/14
USPC ............................................. 718/1, 100, 104
See application file for complete search history.

(56) References Cited

U.S. PATENT DOCUMENTS

| 5,748,882 | A | 5/1998 | Huang | |
|---|---|---|---|---|
| 6,157,965 | A * | 12/2000 | Mohammed | G06F 9/45537 370/401 |
| 8,838,840 | B1 * | 9/2014 | Fair | G06F 11/1402 370/229 |
| 2011/0087912 | A1 * | 4/2011 | Dickson | G06F 1/3203 713/324 |

OTHER PUBLICATIONS

Fujita, et al, "Tgt: Framework for Storage Target Drivers," Proceedings of the Linux Symposium, Ottawa, Ontario, Canada, vol. 1, Jul. 19-22, 2006, pp. 303-312.

* cited by examiner

*Primary Examiner* — Glenn A Auve
(74) *Attorney, Agent, or Firm* — Blakely, Sokoloff, Taylor & Zafman LLP

(57) ABSTRACT

Systems and methods are described that manage service daemons using a unified small computer system interface (SCSI) target management daemon. SCSI target management daemon SCSI target management daemon manages each service daemon operating in a SCSI target device with consideration and knowledge of each other service daemon. This unified system eliminates potential conflicts during service daemon setup and shutdown as SCSI target management daemon is aware of these potential conflicts.

22 Claims, 8 Drawing Sheets

UNIFIED SCSI TARGET MANAGEMENT FOR PERFORMING A DELAYED SHUTDOWN OF A SERVICE DAEMON IN A DEDUPLICATION APPLIANCE

RELATED APPLICATIONS

This application is related to co-pending application Ser. No. 13/929,626, filed Jun. 27, 2013. This application is related to co-pending application Ser. No. 13/929,632, filed Jun. 27, 2013. This application is related to a co-pending application Ser. No. 13/929,621, filed Jun. 27, 2013, which are incorporated by reference herein in its entirety.

FIELD OF THE INVENTION

Embodiments of the present invention relate generally to systems using small computer system interface (SCSI). More particularly, embodiments of the invention relate to enhancing performance of a SCSI system.

BACKGROUND

The small computer system interface (SCSI) is a set of standards for connecting and transferring data between computing systems including storage systems and peripheral computing devices. The SCSI standard defines command sets for a variety of device types and communications between devices. Thus, the SCSI standards hide the complexity of computing systems communications and allow computing systems to independently operate. In addition, SCSI standards provide high communication speeds between computing systems. For example, ultra-640 SCSI offers interface speeds of up to 640 MB/second. Because of these features, SCSI has been popular since its inception in the 1980s.

Originally, SCSI as an interface standard was limited to small computer systems. In the early days of SCSI development, SCSI interfaces were limited to point-to-point systems. Additionally, in the beginning SCSI only supported small numbers of devices (e.g., up to 8) addressable by logical unit numbers (LUNs) and over limited distances (e.g., 25 meters in traditional SCSI configurations and 12 meters in ultra-SCSI configurations). Much progress has been made to move past these original limitations. For example, Internet small computer system interface (iSCSI) is an Internet Protocol (IP) based storage networking standard developed for applications such as linking data storage facilities. In an iSCSI-based system, SCSI commands are carried over IP networks such that data transfers may be performed over longer distances in comparison to traditional SCSI systems. With these increased performance abilities, iSCSI can be used to transmit data over local area networks (LANs), wide area networks (WANs), storage area networks (SANs), or the Internet. Further, iSCSI enables location-independent data storage and retrieval over long distances using existing network infrastructure. Thus, iSCSI and other variations of SCSI have gained popularity based on these improved performance characteristics.

Each of these variants of SCSI protocols and standards, including traditional SCSI, iSCSI, and other SCSI enhancement/variations, comprise the SCSI protocol family. As use of standards from the SCSI protocol family has elevated, the desire to enhance the efficiency and performance of SCSI systems has similarly increased.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. A dataset is a collection of data that is stored in a storage space in a variety of formats.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

System Configuration

Figure 1:
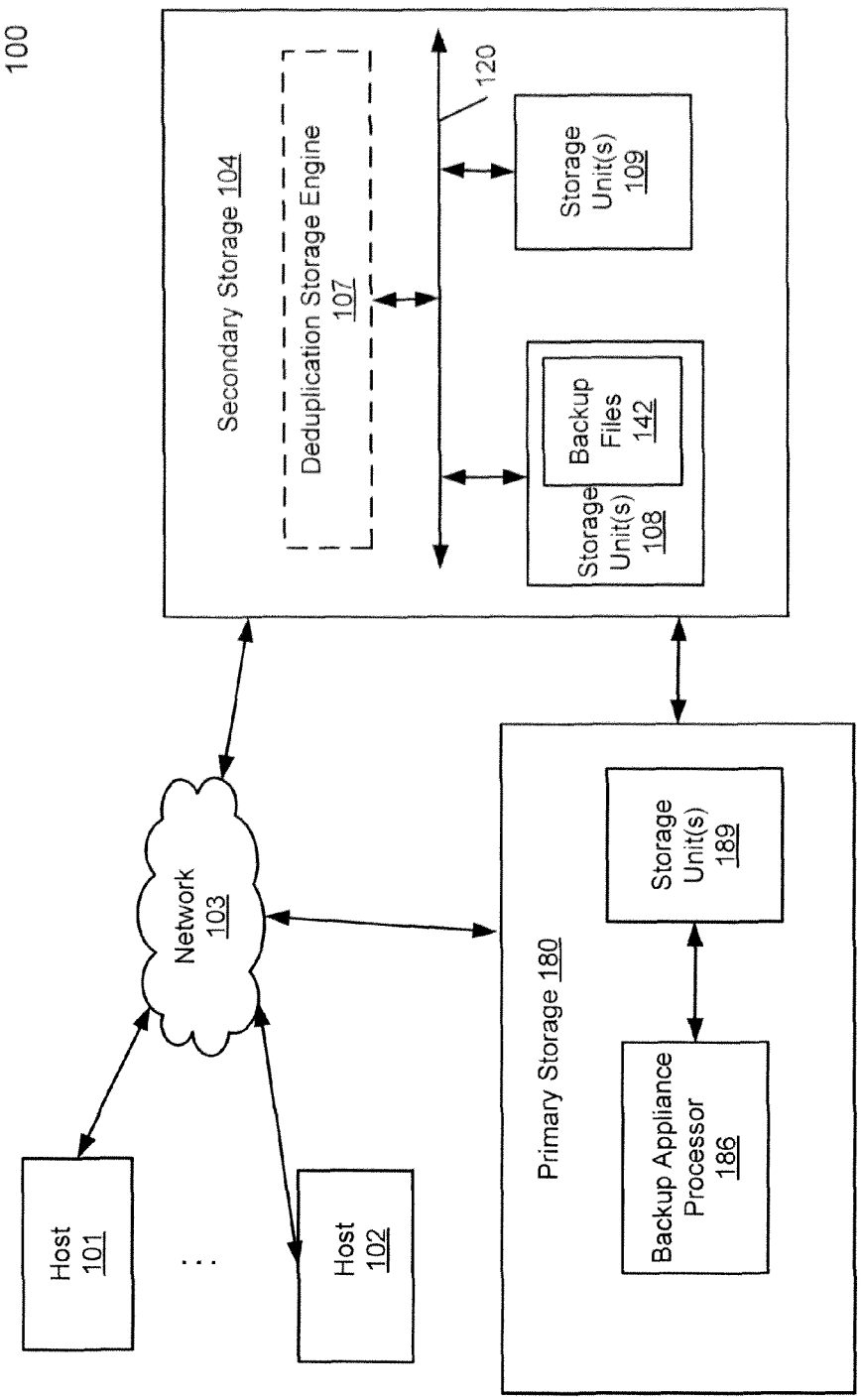
FIG. 1 is a block diagram illustrating a system for backup according to one embodiment of the invention.

FIG. 1 is a block diagram illustrating a backup system 100 according to one embodiment of the invention. Referring to FIG. 1, system 100 includes, but is not limited to, one or more hosts 101-102 communicatively coupled to primary storage 180 and secondary storage 104 over network 103. Hosts 101-102 may be any type of hosts such as a server, a personal computer (e.g., desktops, laptops, and tablets), a "thin" client, a personal digital assistant (PDA), a Web enabled system, a gaming device, a media player, or a mobile phone (e.g., a Smartphone), etc. Network 103 may be any type of wired and/or wireless network such as a local area network (LAN), a wide area network (WAN) such as the Internet, a corporate intranet, a metropolitan area network (MAN), a storage area network (SAN), a bus, or any combination thereof.

Both primary and secondary storage systems 180 and 104 may include any type of server or cluster of servers. For example, storage systems 180 and 104 may be storage servers used for any of various different purposes, such as to provide multiple users with access to shared data and/or to back up mission critical data. The storage systems 180 and 104 may be, for example, a file server (e.g., an appliance used to provide network attached storage (NAS) capability), a block-based storage server (e.g., used to provide storage area network (SAN) capability), a unified storage device (e.g., a device that combines NAS and/or SAN capabilities), a near-line storage device, a direct attached storage (DAS) device, a tape backup device, or any other type of data storage device. Both primary and secondary storage systems 180 and 104 may have a distributed architecture or each of the components of storage systems 180 and 104 may be integrated into a single unit. Both primary and secondary storage systems 180 and 104 may be implemented as part of an archive and/or backup storage system such as a de-duplication storage system available from the EMC® Corporation of Hopkinton, Mass.

In one embodiment, primary storage system 180 includes a backup appliance processor 186. Backup appliance processor 186 coordinates with primary storage 180, secondary storage 104, and hosts 101-102 to run and coordinate various backup and restoration operations, including providing replication services. In one embodiment, backup appliance processor 186 coordinates backup and restoration operations between hosts 101-102 and primary storage 180, where the data from hosts 101-102 is backed up to and restored from storage unit(s) 189. In another embodiment, backup appliance processor 186 coordinates backup and restoration operations between primary storage 180 and secondary storage 104, where the data from storage unit(s) 189 of primary storage 180 are backed up to storage units 108 and 109 on secondary storage 104. In some embodiments, primary storage 180 and secondary storage 104 may be referred to as cascaded storages devices. While backup appliance processor 186 is illustrated in FIG. 1 as residing within primary storage 180, in some embodiments backup appliance processor 186 is embedded within secondary storage 104 or is embedded within a standalone backup appliance server that is communicatively coupled with primary storage 180 and secondary storage 104.

Both primary storage 180 and secondary storage 104 may perform deduplication processes/operations. The deduplication processes performed and storage units allocated may be similar between primary storage 180 and secondary storage 104. Thus, only the processes and storage units within one of primary storage 180 and secondary storage 104 are disclosed below for illustration. In one embodiment, secondary storage 104 may include, but is not limited to, deduplication storage engine 107 and one or more storage units 108 and 109 communicatively coupled to each other. Storage units 108 and 109 may be implemented locally (e.g., a single node operating environment) or remotely (e.g., a multi-node operating environment) via interconnect 120, which may be a bus and/or a network. In one embodiment, one of the storage units 108 and 109 operates as an active storage to receive and store external or fresh user data, while the other storage unit 108 and 109 operates as a target storage unit to periodically archive data from the active storage unit according to an archiving policy or scheme. Storage units 108 and 109 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 108 and 109 may also be a combination of such devices. In the case of disk storage media, the storage units 108 and 109 may be organized into one or more volumes of Redundant Array of Inexpensive Disks (RAID). Backup files 142 represent data stored in storage units 108.

In response to a request to store data in storage units 108 and 109, optional deduplication storage engine 107 is configured to segment the data into multiple segments (also referred to as data chunks or simply chunks) according to a variety of segmentation policies or rules. Deduplication storage engine 107 only stores a segment in a storage unit if the segment has not been previously stored in the storage unit. In the event that a segment has been previously stored, metadata stores information enabling the reconstruction of a dataset using the previously stored segment. As a result, segments of datasets are stored in a deduplicated manner, either within each of storage units 108 and 109 or across at least some of storage units 108 and 109. Data stored in the storage units may be stored in a compressed form (e.g., lossless compression: Huffman coding, Lempel-Ziv Welch coding; delta encoding: a reference to a segment plus a difference; subsegmenting: a list of subsegments or references to subsegments, etc.). In one embodiment, each storage unit 108 and 109 may use different compression methods (e.g., main or active storage unit from other storage units, one storage unit from another storage unit, etc.).

The metadata used for deduplication or other services may be stored in at least some of storage units 108 and 109, such that data can be accessed independent of another storage unit 108 and 109. Metadata of each storage unit 108 and 109 includes enough information to provide access to the data it contains. When an active storage unit 108 or 109 fails, metadata contained in another storage unit 108 or 109 may be utilized to recover the active storage unit 108 or 109. When one storage unit 108 or 109 is unavailable (e.g., the storage unit has failed or is being upgraded, etc.), the system 100 remains up to provide access to any data not stored in the failed storage unit 108 or 109. When data is deleted, the metadata associated with the data in the system 100 is updated to reflect that the data has been deleted.

In one embodiment, the metadata information includes a data identifier, a storage unit identifier indicating where the segments associated with the data identifier are stored, reconstruction information for the data using the segments, and any other appropriate metadata information. In one embodiment, a copy of the metadata is stored on a storage unit 108 or 109 for data stored on a storage unit 108 or 109 such that data that is stored on the storage unit 108 or 109 can be accessed using only the information stored on the storage unit 108 and 109. In one embodiment, a main set of metadata information can be reconstructed by using information of other storage units 108 and 109 associated with the secondary storage 104 in the event that the main metadata is lost, corrupted, damaged, etc. Metadata for a storage unit 108 and 109 can be reconstructed using metadata information stored on a main storage unit or other storage unit (e.g., replica storage unit). Metadata information further includes index information (e.g., location information for segments in storage units 108 and 109).

In one embodiment, each storage unit 108 and 109 as shown in FIG. 1 may be used as a tier of storage in a storage hierarchy that comprises other tiers of storage. One or more tiers of storage in this hierarchy may utilize different kinds of storage devices and/or may be optimized for different characteristics such as random update performance. Data is periodically moved among the tiers based on data management policies to achieve a cost-effective match to the current storage requirements of the datasets. For example, data may initially be stored in a tier of storage that offers high performance for reads and writes. As the data ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

Referring back to FIG. 1, backup appliance processor 186 is configured to back up data from storage unit 189 and to store the backed-up data in one or more of storage units 108 and 109 of secondary storage 104, where the data may be deduplicated by deduplication storage engine 107. A user (e.g., an administrator) initiates a backup request, directly or through a backup schedule, of primary storage 180.

Primary storage 180 may include any type of server or cluster of servers (e.g., remote servers). For example, primary storage 180 may be a storage server used for any of various different purposes, such as to provide multiple users with access to shared data and/or to back up mission critical data. Primary storage 180 may be, for example, a file server (e.g., an appliance used to provide NAS capabilities), a block-based storage server (e.g., used to provide SAN capability), a unified storage device (e.g., one which combines NAS and SAN capabilities), a nearline storage device, a direct attached storage (DAS) device, or any other type of data storage device. Primary storage 180 may have a distributed architecture, or all of the components in primary storage 180 may be integrated into a single unit. Primary storage 180 may be implemented as part of a storage system available from the EMC® Corporation of Hopkinton, Mass.

Primary storage 180 contains storage unit 189, which represents the data stored in primary storage 180. Storage unit 189 may be stored across a number of logical units, and each logical unit is identified by a logical unit number (LUN). Each logical unit may contain a number of sectors. A number of consecutive sectors may be aggregated to form a block for backup data transfer. The backup data transfer in FIG. 1 complies with an implementation of SCSI thus primary storage 180 and secondary storage 104 can be viewed as a SCSI system.

A SCSI system contains at least a SCSI initiator and a SCSI target. Unlike Ethernet protocols, where two communicating parties can both initiate a communication session, the SCSI initiator is always the one initiating communication with the SCSI target in a SCSI system. In a SCSI system, a SCSI initiator initiates a communication session with a request, commonly referred to as an input/output (I/O), to a SCSI target. The SCSI target responds to the request to perform operations such as read, write, xcopy (extended copy), etc.

A computing system, including storage systems and peripheral computing devices, can be a SCSI initiator and a SCSI target at the same time for different SCSI sessions. For example, primary storage 180 is a SCSI target when host 101 sends data to primary storage 180 for backup. Yet primary storage 180 is a SCSI initiator when it sends data to secondary storage 104 for backup. Without being noted otherwise, embodiments of the invention can be implemented for communications between hosts 101 and/or 102 and primary storage 180 and between primary storage 180 and secondary storage 104. Indeed, embodiments of the invention can be implemented in any SCSI system containing a SCSI initiator and a SCSI target to enhance performance of the SCSI system.

Figure 2:
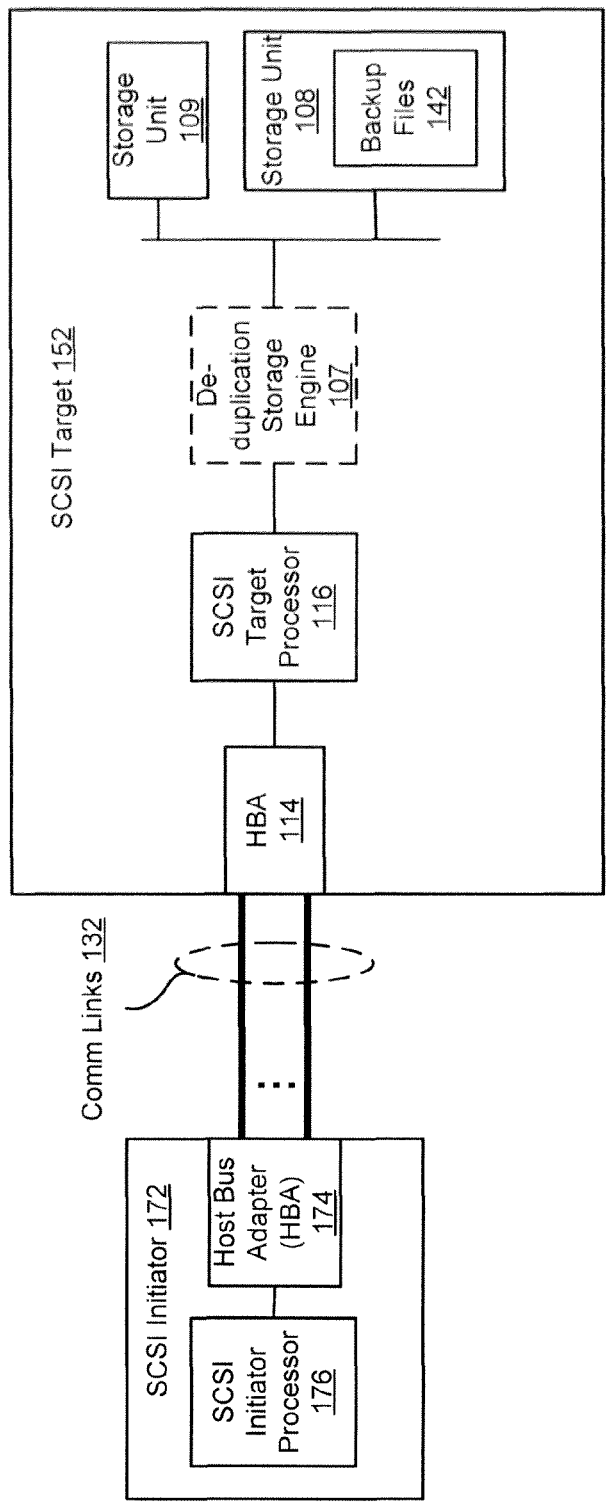
FIG. 2 is a block diagram illustrating a process of enhancing link anomaly tolerance at a SCSI system according to one embodiment of the invention.

FIG. 2 is a block diagram illustrating a SCSI system 200. In one embodiment, system 200 is a zoom-in of a portion of system 100 in FIG. 1 with some components/entities not shown. System 200 may represent hosts 101 and 102 (SCSI initiator 172 of FIG. 2) and primary storage 180 (SCSI target 152 of FIG. 2). Further, system 200 may also represent primary storage 180 (SCSI initiator 172 of FIG. 2) and secondary storage 104 (SCSI target 152 of FIG. 2).

SCSI initiator 172 contains SCSI initiator processor 176 and host bus adapter (HBA) 174. SCSI initiator processor 176 may be implemented as a part of backup appliance processor 186 of FIG. 1 but SCSI initiator processor 176 may also be implemented as a standalone processor coordinating SCSI communication with SCSI target 152. HBA 174 is the input/output interface through which SCSI initiator 172 communicates with SCSI target 152. That is, commands, data, status and messages are transmitted to and from HBA 174 for SCSI initiator processor 176 to process. While HBA 174 is illustrated, the embodiments of the invention are not limited to any specific SCSI I/O interface and they apply to other types of SCSI I/O interfaces (e.g., converged network adapters (CANs)).

SCSI target 152 contains SCSI target processor 116, target HBA 114, and storage units 108 and 109. Optionally, SCSI target 152 may also contain deduplication storage engine 107. Deduplication storage engine 107 and storage units 108 and 109 may serve the same functions as the blocks with the same references in FIG. 1. SCSI target processor 116 is the processor coordinating SCSI communication with SCSI initiator 172 and performing a variety of operations to process SCSI commands. Target HBA 114 is the input/output interface through which SCSI target 152 communicates with SCSI initiator 172. Through target HBA 114 and initiator HBA 174, SCSI target 152 and SCSI initiator 172 are communicatively coupled with each other through a set of communication links 132.

Communication links 132 may be built using a variety of mediums. The mediums may be made of optical fibers or electrical connections. For example, communication links 132 may be fiber channels (FCs) and SCSI initiator 172 may communicate with SCSI target 152 through a storage area network (SAN). Fiber channel protocols (FCPs) may then be utilized for communication between SCSI initiator 172 and SCSI target 152. When communication links 132 passes through an Ethernet network, different protocols, such as fiber channel over Transmission Control Protocol/Internet Protocol (TCP/IP FCIP) may be utilized for communication between SCSI initiator 172 and SCSI target 152. The medium for communication links 132 may also be made of copper (such as twisted pairs) or other suitable mediums. Both FCP and FCIP may be utilized for the communication between the two parties 172 and 152 along with other mediums. In one embodiment, communication links 132 may contain a set of one or more links.

Operations of a SCSI Target Processor

Figure 3A:
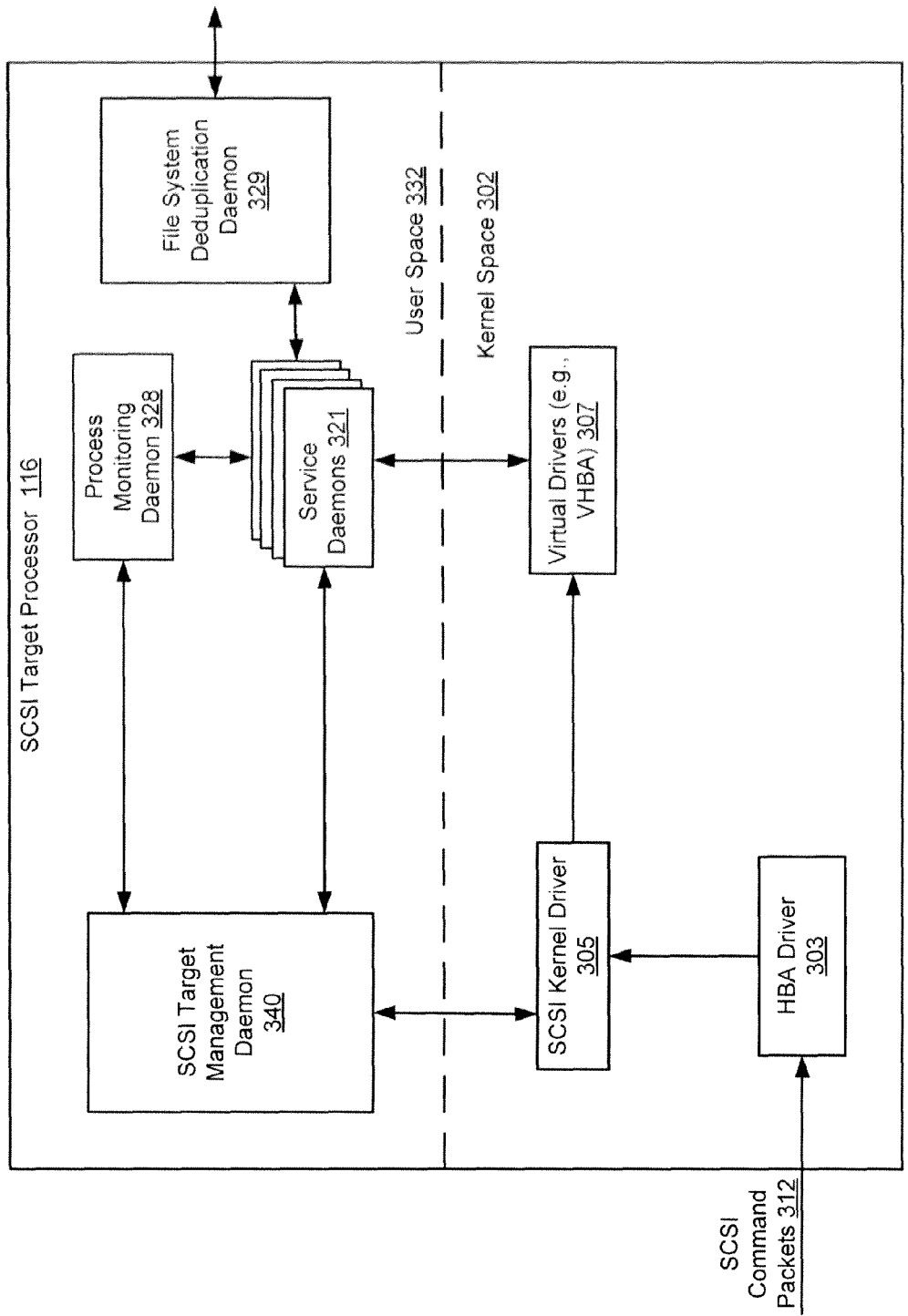
FIG. 3A is a block diagram illustrating interactions between a SCSI initiator and a SCSI target implementing the process of enhancing link anomaly tolerance according to one embodiment of the invention.

FIG. 3A is a block diagram illustrating operations within a SCSI target processor. The operations are for the SCSI target processor with illustrated modules but embodiments of the invention are not limited to a specific SCSI target processor with the illustrated modules. A SCSI target processor with more or less modules may perform more, less, or different functions to implement the principle of the invention disclosed herein.

At a SCSI target, SCSI commands are received at an I/O interface (e.g., Target HBA 114 of FIG. 2) of the SCSI target. The received SCSI commands are then passed to a SCSI target processor for processing. Referring to FIG. 3A, SCSI target processor 116 receives SCSI commands formatted as SCSI command packets 312 and processes these packets.

SCSI target processor 116 interacts with memories that may be divided into two conceptual spaces: user space 332 and kernel space 302. A computer operating system usually segregates virtual memory into a kernel space and a user space. Kernel space is strictly reserved for running the kernel, kernel extensions, and most device drivers. In contrast, user space is the memory area where all user mode applications work and this memory can be swapped out when necessary. The user mode applications access kernel space through system calls.

Referring to FIG. 3A, SCSI command packets 312 enter SCSI target processor 116, which is processed by host bus adapter (HBA) driver 303. The SCSI command packets are then passed to SCSI target kernel driver 305. SCSI target kernel driver 305 is responsible for routing the SCSI command packets in kernel space 302. For example, SCSI kernel 305 routes the SCSI command packets to virtual drivers 307. SCSI target kernel driver 305 may also determine that a SCSI command should not be routed (e.g., the SCSI command comes from a SCSI initiator not coupled to the SCSI target). Virtual drivers 307 can be implemented in a variety of ways, and in one embodiment, the virtual drivers may be implemented as a virtual host bus adapter (VHBA). Virtual drivers 307 accept SCSI commands and make the commands available to user space 332 (e.g., through a file descripter).

In user space 332, a variety of services take the SCSI commands made available by virtual drivers 307, process the commands, and provide responses to the SCSI commands to the SCSI initiator sending the SCSI commands. The variety of services each has its own daemon, illustrated as service daemons 321. Service daemons 321 performs functions such as configuring services, responding to hardware/software activities relating to the services, running scheduled tasks, and performing other tasks/operations. Each service may have its own daemon because SCSI commands are processed differently depending on the type of service. Service daemons 321 interact with file system deduplication daemon 329 to access data stored in a deduplicated storage.

The variety of services represented by the service daemons 321 includes services providing storage virtualization such as virtual tape library (VTL) and virtual disks. Virtual tape libraries provide an alternative to physical tape libraries. The virtual tape libraries appear to be physical tape libraries to the applications running on hosts 101 and 102. These virtual tape libraries may emulate physical tape libraries including all of the SCSI commands utilized by, for example, backup programs to interact with the physical tape libraries. However, the virtual tape libraries typically do not actually store the data on physical magnetic tapes, but rather store the data on one or more hard disk drive arrays, solid state storage devices, or other types of physical storage. This offers an advantage that the virtual tape libraries do not need to rely on the mechanical components, such as robotic arms used for physical tape libraries. Moreover, backup applications or other software utilizing the virtual tape library, do not need to know that physical magnetic tapes are not being used for data storage, and do not need to be changed. This helps to avoid modifying existing backup applications and technology that has been designed to use physical tape libraries. As a further advantage, the data stored by a backup application to a virtual tape may be stored as a file of a file system. As such, the virtual tape libraries are generally able to take advantage of advanced file system functionalities, such as improved ability to perform data deduplication, replication, redundancy, segmenting, and/or other file system based technologies. In other embodiments, the daemon services 321 may represent other data storage services, including disk block services, Data Domain Boost (DD Boost) over Fibre Channel, etc.

SCSI target management daemon 340 is a module running to monitor execution of SCSI commands within SCSI target processor 116. SCSI target management daemon 340 receives service state update of service daemons 321 and monitors initiation and exit of these service daemons 321. For example, SCSI target management daemon 340 monitors service daemons 321 for:

- Adding a SCSI device;
- Removing a SCSI device;
- Creating an access group to access stored data (e.g., in a VTL);
- Destroying an access group;
- Adding a LUN to an access group;
- Removing a LUN from an access group;
- Modifying a LUN in an access group;
- Adding a SCSI initiator to an access group; and
- Removing a SCSI initiator from an access group.

Process monitoring daemon 328 is a module responsible to terminate and initiate a service daemon 321. In one embodiment, process monitoring daemon 328 detects exit of a service daemon 321 and reinitiates it after a period of time.

Figure 3B:
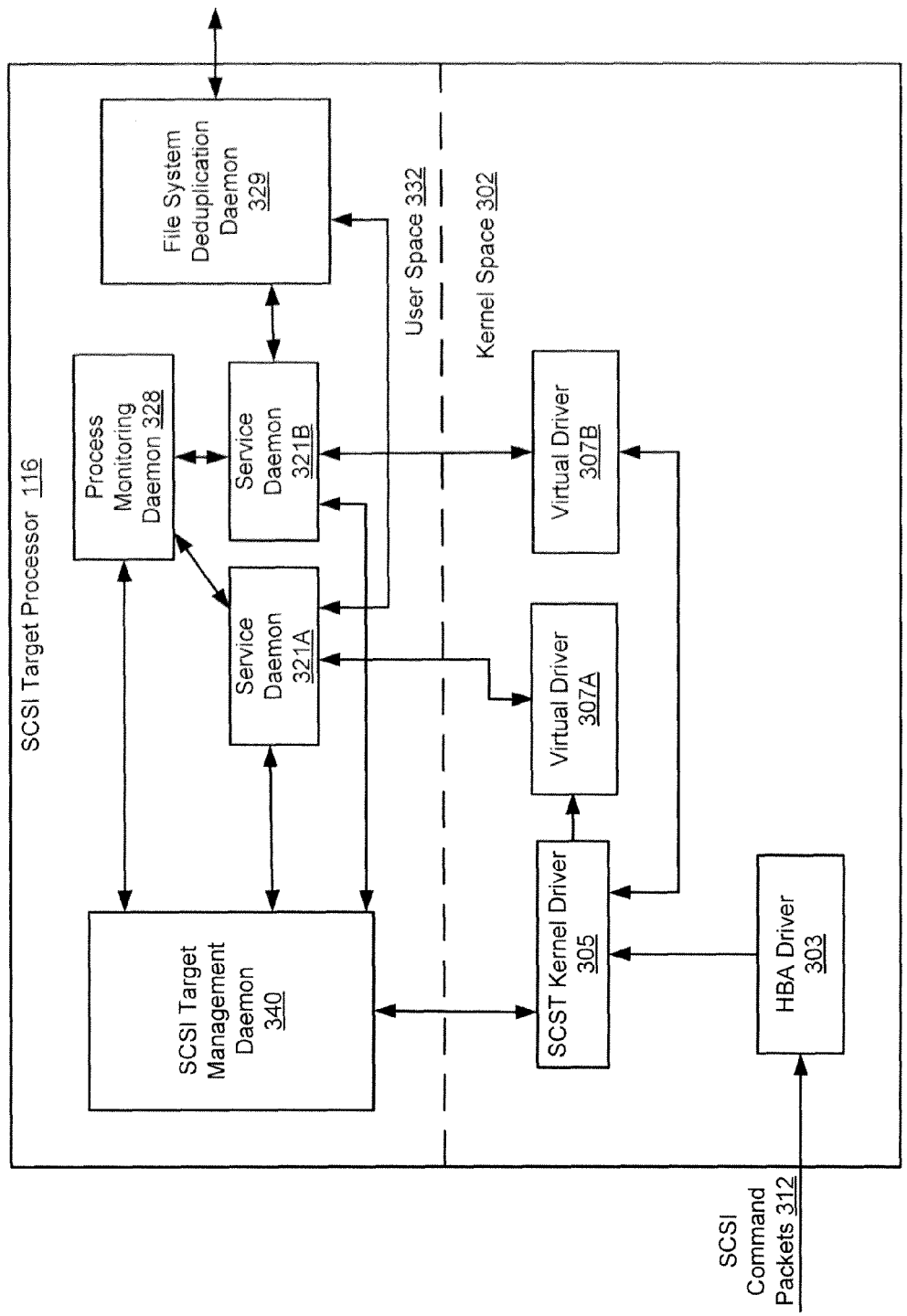
FIG. 3B is a block diagram illustrating interactions between a SCSI initiator and a SCSI target implementing the process of enhancing link anomaly tolerance according to one embodiment of the invention.

As noted above, separate service daemons 321 may be instantiated for each type of data storage service running on SCSI service processor 116. For example, as shown in FIG. 3B, service daemon 321A may be used for providing VTL services to initiator hosts 101 and 102 and service daemon 321B may be used for providing DFC services to initiator hosts 101 and 102. Each of these service daemons 321A and 321B processes SCSI commands received from hosts 101 and/or 102 on one or more SCSI targets 152. Each of these service daemons 321A and 321B may be associated with corresponding virtual drivers 307A and 307B, respectively. Virtual drivers 307A and 307B serve as repositories for SCSI command packets 312 received from hosts 101 and/or 102 and intended for service daemon 321A and 321B, respectively. For example, VTL SCSI commands are stored in virtual driver 307A and are accessible to service daemon 321A while DFC commands are stored in virtual driver 307B and accessible to service daemon 321B. Although shown in relation to service daemons 321A and 321B for VTL and DFC data storage services, respectively, in other embodiments additional service daemons 321 may be utilized for other data storage services (e.g., DD Boost over FC available from the EMC® Corporation of Hopkinton, Mass.).

SCSI target management daemon 340 may provide a unified process for managing the start-up/configuration, shutdown/deconfiguration, and crash control for each of service daemon 321A and 321B. By providing a centralized and unified control process, SCSI target management daemon 340 allows multiple types of service daemons 321 to be running on the SCSI target processor 116 simultaneously and without conflicts with other service daemons 321. For example, as will be described in further detail below, service daemons 321 may be started/configured and shutdown/deconfigured by SCSI target management daemon 340 without interrupting the operation of other service daemons 321.

Starting and Configuring a Service Daemon

Figure 4:
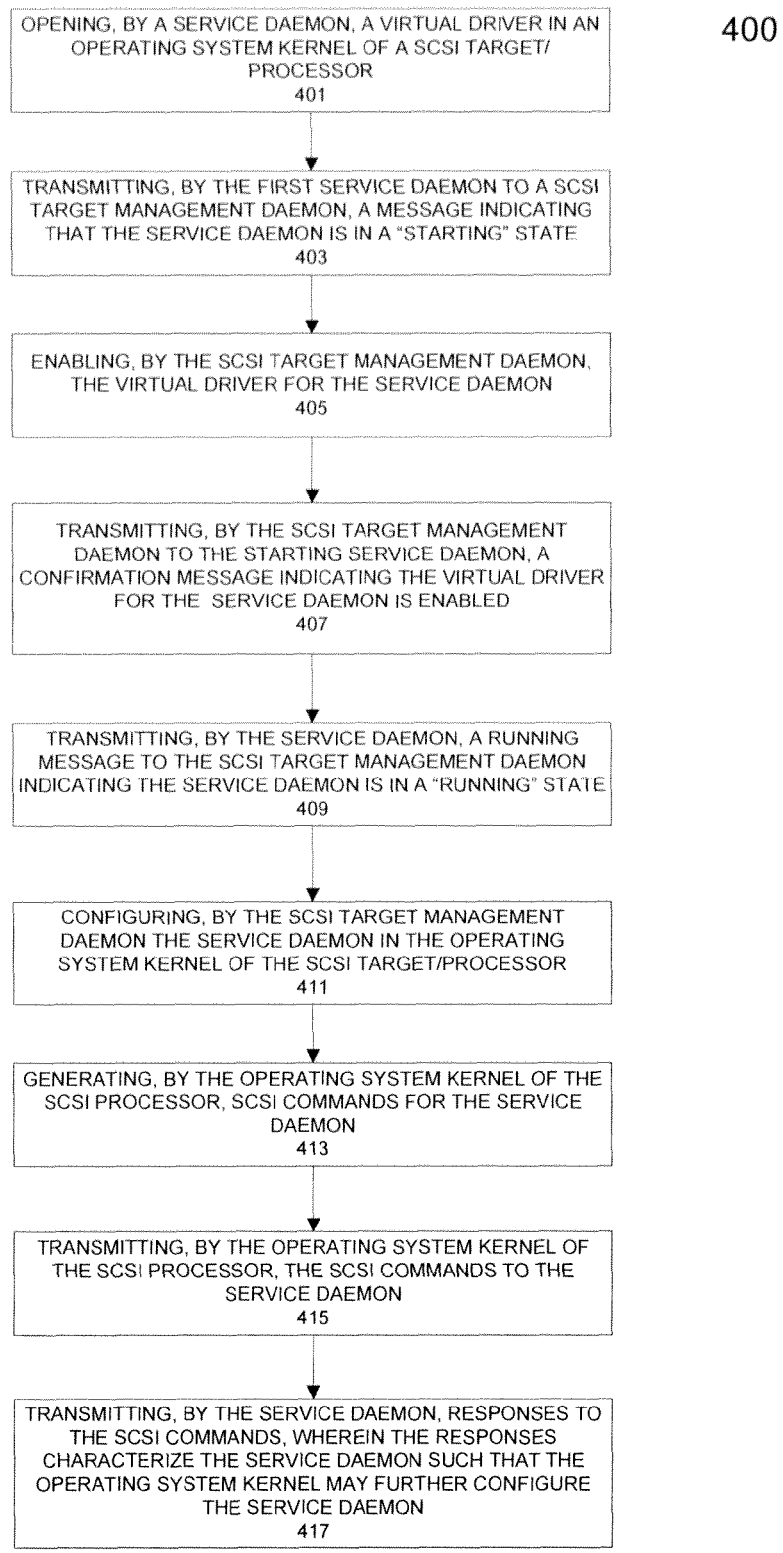
FIG. 4 is a flow diagram illustrating a method for starting and configuring a service daemon according to one embodiment of the invention.

FIG. 4 shows a method 400 for starting and configuring service daemon 321A according to one embodiment. Method 400 may be performed by one or more components of SCSI target processor 116. For example, method 400 may be performed by SCSI target management daemon 340 working in conjunction with service daemon 321A, virtual driver 307A associated with service daemon 321A, and SCSI target kernel driver 305.

Method 400 begins at operation 401 with service daemon 321A opening virtual driver 307A in kernel space 302 of SCSI target processor 116. Once enabled, as described in further detail below, the opened virtual driver 307A serves as a repository for SCSI command packets 312 received from hosts 101 and/or 102 and intended for service daemon 321A. For example, in an embodiment in which service daemon 321A is a VTL service daemon, VTL SCSI command packets 312 are stored in virtual driver 307A.

At operation 403, upon opening virtual driver 307A in kernel space 302 of SCSI target processor 116, service daemon 321A may send a message to SCSI target management daemon 340 indicating that service daemon 321A is in a "starting" or "startup" state. While in a "starting" or "startup" state, service daemon 321A is expected to handle local incoming SCSI command packets 312 from hosts 101 and 102, but is not visible on transports (i.e., communication links 132). In one embodiment, the message indicating service daemon 321A is starting may be passed between service daemon 321A and SCSI target management daemon 340 over an open data connection between the processes. The open data connection may be similarly used, as will be described in further detail below in relation to other operations, to communicate the health and status of service daemon 321A.

After receipt of the message from service daemon 321A indicating service daemon 321A is starting or is in a "starting" or "startup" state, SCSI target management daemon 340 enables the opened virtual driver 307A at operation 405. In one embodiment, SCSI target management daemon 340 may transmit a message to one or more components in kernel space 302 to instigate the enablement of the opened virtual driver 307A. For example, SCSI target management daemon 340 may transmit a message to SCSI kernel driver 305 to prompt SCSI kernel driver 305 to enable the opened virtual driver 307A. Enabling the opened virtual driver 307A allows SCSI command packets 312 received from one or more of initiator hosts 101 and 102 to be written to and/or queued in the opened virtual driver 307A.

After enabling the opened virtual driver 307A, SCSI target management daemon 340 may transmit a message to service daemon 321A confirming the enablement of the open virtual driver 307A at operation 407. In one embodiment, the message confirming the enablement of the open virtual driver 307A may be passed between service daemon 321A and SCSI target management daemon 340 over the open data connection between the processes discussed above in relation to operation 403.

Upon the service daemon 321A completing its startup procedure, service daemon 321A may send a message to SCSI target management daemon 340 indicating that startup is complete and service daemon 321A is in a "running" state at operation 409. Similar to other messages described above, the message indicating that service daemon 321A is in a "running" state may be passed between service daemon 321A and SCSI target management daemon 340 over the open data connection between the processes discussed above in relation to operations 403 and 407. In the "running" state, configured devices accessible through service daemon 321A are available to hosts 101 and 102.

Upon receiving the message indicating service daemon 321A is in a "running" state, SCSI target management daemon 340 configures service daemon 321A at operation 411. In one embodiment, configuration of service daemon 321A includes the creation and association of LUNs and transport ports with corresponding hosts 101 and/or 102, such that access to segments of data on SCSI targets 152 is restricted to appropriate hosts 101 and 102. Restriction of access may be facilitated by the creation of access groups within kernel space 302. An access group can define the SCSI devices advertised to hosts 101 and 102 and at which transport ports of host bus adapter 114 those devices are to be advertised. Each SCSI device may be mapped to a respective LUN for an access group. In some embodiments, a SCSI device can be added to more than one access group, so the SCSI device can be mapped to a LUN for each access group of which it is a member. Each of these relationships and data structures may be established and configured in SCSI kernel driver 305 at operation 411.

In one embodiment, operation 411 may be performed for service daemon 321A while other service daemons 321 are operating. In this embodiment, operations 411 is performed by SCSI target management daemon 340 transparent to the other service daemons 321 such that processing of SCSI command packets 312 by these service daemons 321 is not interrupted or altered.

In one embodiment, SCSI Kernel driver 305 may generate SCSI virtual driver commands at operation 413. The SCSI virtual driver commands are intended to characterize service daemon 321A based on responses from service daemon 321A to the generated commands. In one embodiment, SCSI Kernel driver 305 may pass the generated SCSI virtual driver commands to service daemon 321A at operation 415. The SCSI virtual driver commands may be passed to service daemon 321A by transmitting the commands to the corresponding virtual driver 307A. Virtual driver 307A for service daemon 321A may thereafter make the received SCSI virtual driver commands available to service daemon 321A for processing. In one embodiment, service daemon 321A responds to each of the SCSI virtual driver commands at operation 417. As noted above, the responses to the SCSI virtual driver commands are used to further characterize and configure service daemon 321A in SCSI kernel driver 305.

As discussed above, method 400 starts and configures service daemon 321A using SCSI target management daemon 340. SCSI target management daemon 340 may similarly operate to configure other service daemons 321 in SCSI target processor 116. In some embodiments, service daemons 321, including service daemon 321A, may share transport ports with other running or starting service daemons 321 that are configured by SCSI target management daemon 340. Accordingly, SCSI target management daemon 340 may configure each service daemon 321 with consideration and knowledge of other service daemons 321 on SCSI target processor 116. This unified system eliminates potential conflicts during service daemon 321 setup and shutdown as SCSI target management daemon 340 is aware of these potential conflicts.

Shutting Down and De-Configuring a Service Daemon

Figure 5:
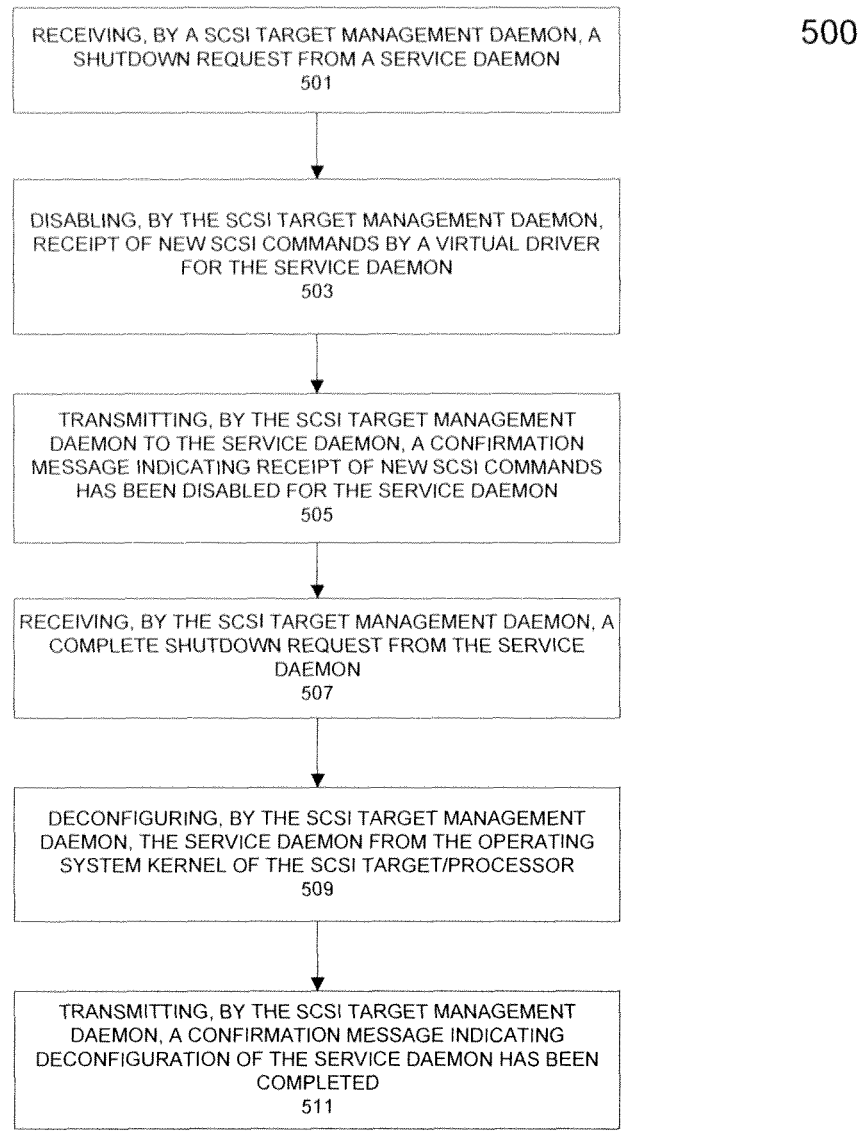
FIG. 5 is a flow diagram illustrating a method for shutting down and de-configuring a service daemon according to one embodiment of the invention.

FIG. 5 shows a method 500 for shutting down and de-configuring service daemon 321A according to one embodiment. Method 500 may be performed by one or more components of SCSI target processor 116. For example, method 500 may be performed by SCSI target management daemon 340 working in conjunction with service daemon 321A, virtual driver 307A associated with service daemon 321A, and SCSI kernel driver 305.

Method 500 begins at operation 501 with SCSI target management daemon 340 receiving a start shutdown message/request from service daemon 321A. The start shutdown message indicates that service daemon 321A has entered a "shutting down" state and would like to have data structures and relationships associated with service daemon 321A removed from SCSI kernel driver 305. In one embodiment, the message indicating service daemon 321A is in a "shutting down" state may be passed between service daemon 321A and SCSI target management daemon 340 over an open data connection between the processes. The open data connection may be similarly used, as will be described in further detail below in relation to other operations, to communicate the health and status of service daemon 321A. This open data connection may be the same data connection utilized in method 400 to startup service daemon 321A In response to the shutdown message from service daemon 321A, at operation 503 SCSI target management daemon 340 disables receipt of new SCSI command packets 312 by virtual driver 307A. As noted above, virtual driver 307A serves as a repository for SCSI command packets 312 received from hosts 101 and/or 102 and intended for service daemon 321A. For example, in an embodiment in which service daemon 321A is a VTL service daemon, VTL SCSI command packets 312 are stored in virtual driver 307A. By disabling receipt of SCSI command packets 312, SCSI kernel driver 305 denies or sends busy commands to hosts 101 and/or 102 who are attempting to send SCSI messages to service daemon 321A.

In one embodiment, SCSI target management daemon 340 disables receipt of new SCSI command packets 312 by transmitting a disable message to SCSI kernel driver 305. The disable message trigger SCSI kernel driver 305 to disable receipt of further SCSI command packets 312 for service daemon 321A and virtual driver 307A.

After disabling receipt of new SCSI command packets 312, SCSI target management daemon 340 transmits a confirmation message to service daemon 321A at operation 505. The confirmation message indicates that receipt of new SCSI command packets 312 has been disabled for service daemon 321A. In one embodiment, the confirmation message may be passed between SCSI target management daemon 340 and service daemon 321A over the open data connection between the processes discussed above in relation to operation 501.

After service daemon 321A has completed its shutdown and has transitioned from a "shutting down" state to a "shutdown" state, service daemon 321A transmits a complete shutdown message, which is received by SCSI target management daemon 340 at operation 507. The complete shutdown message indicates that service daemon 321A has entered a full "shutdown" state. In one embodiment, the complete shutdown message may be passed between service daemon 321A and SCSI target management daemon 340 over the open data connection between the processes discussed above in relation to operations 501 and 505.

Following receipt of the shutdown message from service daemon 321A, SCSI target management daemon 340 de-configures service daemon 321A in SCSI kernel driver 305 at operation 509. In one embodiment, de-configuration of service daemon 321A includes the removal of data structures and relationships within SCSI kernel driver 305, which are associated with service daemon 321A. For example, SCSI target management daemon 340 may remove LUNs and access groups associated with service daemon 321A from SCSI kernel driver 305. In one embodiment, SCSI target management daemon 340 is aware of each other active/running service daemon 321 within SCSI target processor 116. These service daemons 321 may share configuration data or relationships with service daemon 321A. For example, service daemon 321A may share a transport port with service daemon 321B. By understanding the interrelationships between each service daemon 321, SCSI target management daemon 340 may de-configure and remove elements from SCSI kernel driver 305 for service daemon 321A without affecting other service daemons 321 within SCSI target processor 116. Thus, operation 509 may be performed for service daemon 321A transparent to operation of other service daemons 321 running within SCSI target processor 116.

After de-configuring service daemon 321A, SCSI target management daemon 340 transmits a confirmation message to service daemon 321A at operation 511. The confirmation message indicates that all associated data has been removed from kernel space 302 for service daemon 321A. In one embodiment, the confirmation message may be passed between SCSI target management daemon 340 and service daemon 321A over the open data connection between the processes discussed above in relation to operations 501, 505, and 507.

Managing a Crashed Service Daemon

Figure 6:
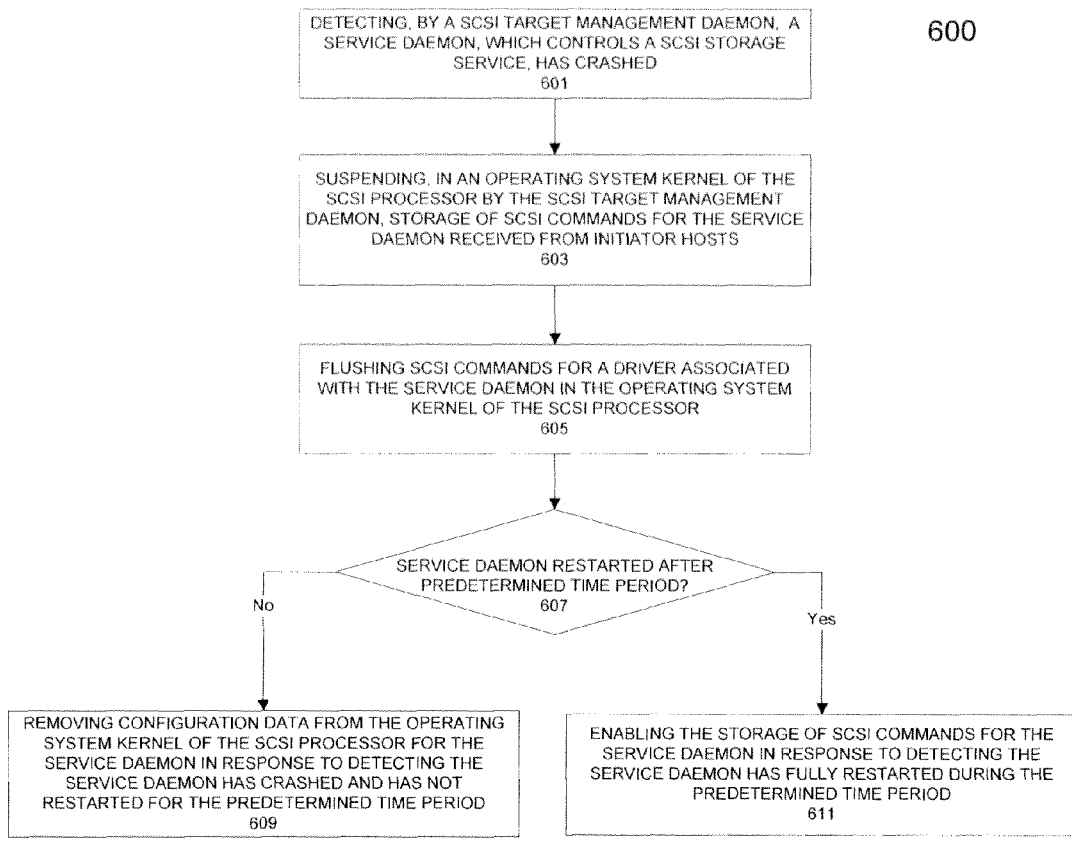
FIG. 6 is a flow diagram illustrating a method for managing a crashed service daemon according to one embodiment of the invention.

FIG. 6 shows a method 600 for managing a service daemon 321A, which has crashed while in a "running" state, according to one embodiment. Method 600 may be performed by one or more components of SCSI target processor 116. For example, method 600 may be performed by SCSI target management daemon 340 working in conjunction with service daemon 321A, virtual driver 307A associated with service daemon 321A, and SCSI kernel driver 305.

Method 600 begins at operation 601 when SCSI target management daemon 340 detects that service daemon 321A has crashed after being in a "running" state. In the "running" state, configured devices accessible through service daemon 321A are available to hosts 101 and 102. In contrast, after crashing service daemon 321A is not available to hosts 101 and 102 and is not active on SCSI target processor 116 to process SCSI commands.

SCSI target management daemon 340 may detect that service daemon 321A has crashed using several techniques. In one embodiment, SCSI target management daemon 340 maintains an open data connection with service daemon 321A. SCSI target management daemon 340 may periodically transmit requests to service daemon 321A to confirm service daemon 321A is still in a "running" state. Upon failure to receive a response, SCSI target management daemon 340 may determine that service daemon 321A has crashed.

In one embodiment, SCSI target management daemon 340 may query process monitoring daemon 328 for the status/state of service daemon 321A. Process monitoring daemon 328 communicates with each service daemon 321 operating on SCSI target processor 116 to maintain a state library for each service daemon 321. In one embodiment, SCSI target management daemon 340 queries processing monitoring daemon 328 to determine the state of service daemon 321A after detecting that the open data connection between SCSI target management daemon 340 and service daemon 321A has been lost.

After determining that service daemon 321A has crashed, operation 603 disables/suspends receipt of new SCSI command packets 312 by virtual driver 307A. As noted above, virtual driver 307A serves as a repository for SCSI command packets 312 received from hosts 101 and/or 102 and intended for service daemon 321A. For example, in an embodiment in which service daemon 321A is a VTL service daemon, VTL SCSI command packets 312 are stored in virtual driver 307A. By disabling receipt of SCSI command packets 312, SCSI kernel driver 305 denies or sends busy messages to hosts 101 and/or 102 who are attempting to send SCSI commands to service daemon 321A.

In some embodiments, operation 605 may flush SCSI command packets 312 stored in virtual driver 307A. Flushing SCSI command packets 312 removes the commands from the queue for the crashed service daemon 321A.

At operation 607, SCSI target management daemon 340 determines whether service daemon 321A has been restarted. In one embodiment, SCSI target management daemon 340 determines whether service daemon 321A has restarted by one or more of determining whether the previously lost data connection between service daemon 321A and SCSI target management daemon 340 has been reestablished and/or by querying process monitoring daemon 328 to determine the state of service daemon 321A. Operation 607 may be performed continuously for a predetermined time period. For example, operation 607 may determine whether service daemon 321A has been restarted for four minutes.

Upon determining that service daemon 321A has not restarted after the predetermined time period, SCSI target management daemon 340 de-configures service daemon 321A in SCSI kernel driver 305 at operation 609. In one embodiment, deconfiguration of service daemon 321A includes the removal of data structures and relationships within SCSI kernel driver 305, which are associated with service daemon 321A. For example, SCSI target management daemon 340 may remove LUNs and access groups associated with service daemon 321A from SCSI kernel driver 305. In one embodiment, SCSI target management daemon 340 is aware of each active/running service daemon 321 within SCSI target processor 116. These service daemons 321 may share configuration data or relationships with service daemon 321A. For example, service daemon 321A may share a transport port with service daemon 321B. By understanding the interrelationships between each service daemon 321, SCSI target management daemon 340 may de-configure and remove elements from SCSI kernel driver 305 for service daemon 321A without affecting other service daemons 321 within SCSI target processor 116. Thus, operation 609 may be performed for service daemon 321A transparent to operation of other service daemons 321 running within SCSI target processor 116.

Alternatively, upon determining that service daemon 321A has restarted during the predetermined time period at operation 607, SCSI target management daemon 340 enables virtual driver 307A at operation 611. In one embodiment, SCSI target management daemon 340 may transmit a message to one or more components in kernel space 302 to instigate the enablement of virtual driver 307A. For example, SCSI target management daemon 340 may transmit a message to SCSI kernel driver 305 to prompt SCSI kernel driver 305 to enable virtual driver 307A. Enabling the opened virtual driver 307A allows SCSI command packets 312 received from one or more of initiator hosts 101 and 102 to be written to and/or queued in the opened virtual driver 307A. By waiting and monitoring crashed service daemon 321A for a predetermined time period, method 600 allows the service daemon 321A to naturally restart without severely affecting the operation of backup system 100.

Delayed Shutdown of Service Daemon

Figure 7:
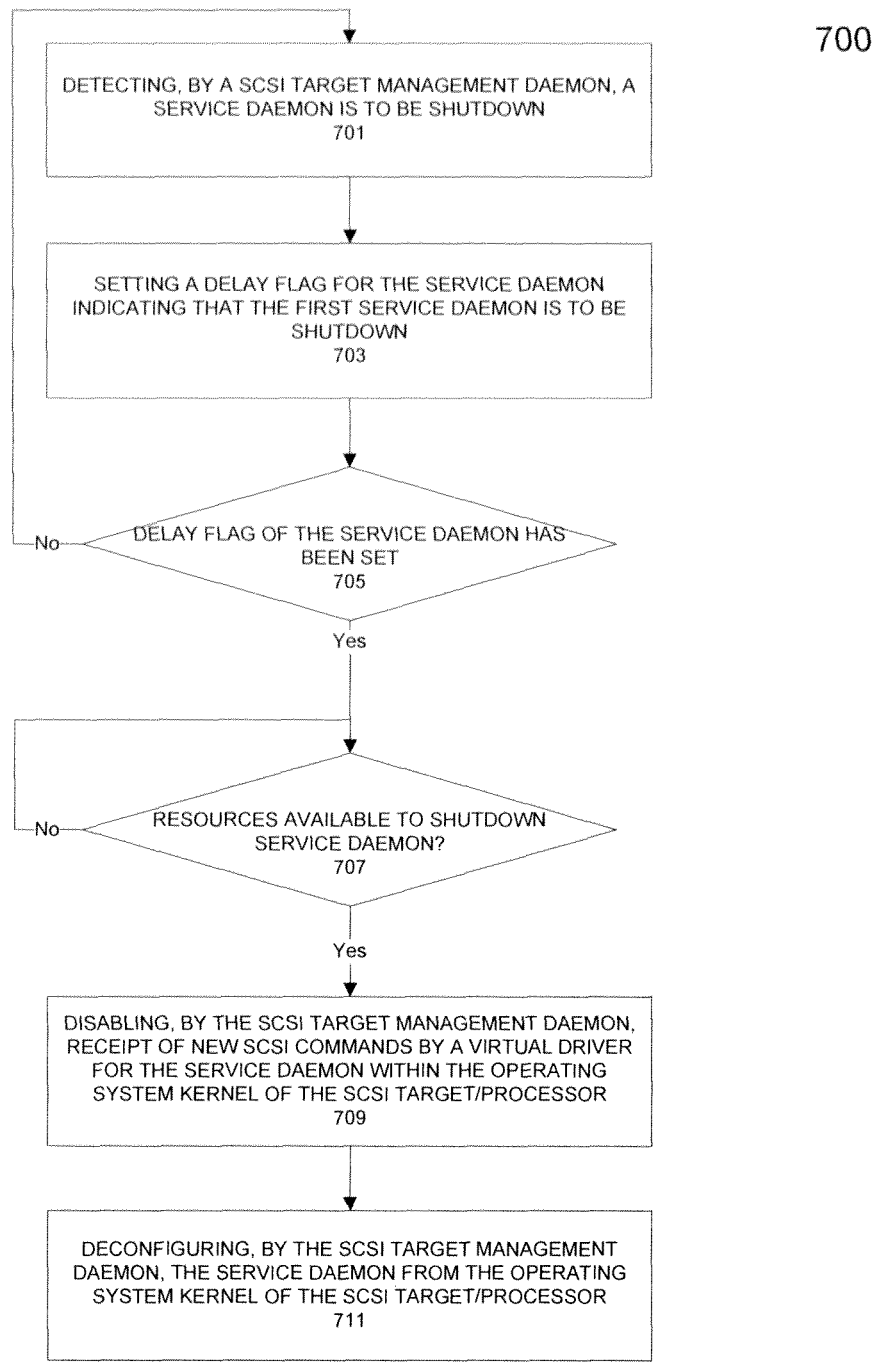
FIG. 7 is a flow diagram illustrating a method for performing a delayed shutdown of a service daemon according to one embodiment of the invention.

In some embodiments, shutting down service daemon 321A may not be immediately available. For instance, if another service daemon 321 is changing state, service daemon 321A is involved in a prolonged startup sequence, or SCSI target processor 116 is otherwise busy and unable to immediately handle the shutdown of service daemon 321A. FIG. 7 shows a method 700 for managing a delayed shutdown of service daemon 321A according to one embodiment. Method 700 may be performed by one or more components of SCSI target processor 116. For example, method 700 may be performed by SCSI target management daemon 340 working in conjunction with service daemon 321A, virtual driver 307A associated with service daemon 321A, and SCSI kernel driver 305.

Method 700 begins at operation 701 with SCSI target management daemon 340 detecting that service daemon 321A is to be shutdown when SCSI target processor 116 is available to process the shutdown request. SCSI target management daemon 340 may determine that service daemon 321A is ready to be shutdown after detecting that service daemon 321A has stalled while performing an operation or after receiving a shutdown request/message from service daemon 321A.

After detecting that service daemon 321A is to be shutdown, at operation 703 SCSI target management daemon 340 sets/triggers a delayed shutdown flag associated with service daemon 321A. The delayed shutdown flag indicates that service daemon 321A is to be shutdown when SCSI target processor 116 is available to process a shutdown request.

At operation 705, a thread of SCSI target management daemon 340 periodically runs to determine if a delay shutdown flag for service daemon 321A or any other service daemon 321 is set. The thread of SCSI target management daemon 340 is a subset of instructions within SCSI target management daemon 340 and can be managed independently by an operating system scheduler. In one embodiment, the thread of SCSI target management daemon 340 may run every sixty seconds. Upon determining that a delay flag has been set for service daemon 321A, operation 707 determines if service daemon 321A may be shutdown based on availability of resources (e.g., availability of SCSI target processor 116 and/or whether service daemon 321A is available). If operation 707 determines that the flagged service daemon 321A may be shutdown, operation 709 attempts to shutdown service daemon by disabling receipt of new SCSI command packets 312 by virtual driver 307A. As noted above, virtual driver 307A serves as a repository for SCSI command packets 312 received from hosts 101 and/or 102 and intended for service daemon 321A. For example, in an embodiment in which service daemon 321A is a VTL service daemon, VTL SCSI command packets 312 are stored in virtual driver 307A. By disabling receipt of SCSI command packets 312, SCSI kernel driver 305 denies or sends busy commands to hosts 101 and/or 102 who are attempting to send SCSI messages to service daemon 321A. In one embodiment, operation 709 may also flush SCSI command packets 312 stored in virtual driver 307A. Flushing SCSI command packets 312 removes the commands from the queue for service daemon 321A.

Following operation 709, SCSI target management daemon 340 de-configures service daemon 321A in SCSI kernel driver 305 at operation 711. In one embodiment, de-configuration of service daemon 321A includes the removal of data structures and relationships within SCSI kernel driver 305, which are associated with service daemon 321A. For example, SCSI target management daemon 340 may remove LUNs and access groups associated with service daemon 321A from SCSI kernel driver 305. In one embodiment, SCSI target management daemon 340 is aware of each other active/running service daemon 321 within SCSI target processor 116. These service daemons 321 may share configuration data or relationships with service daemon 321A. For example, service daemon 321A may share a transport port with service daemon 321B. By understanding the interrelationships between each service daemon 321, SCSI target management daemon 340 may de-configure and remove elements from SCSI kernel driver 305 for service daemon 321A without affecting other service daemons 321 within SCSI target processor 116. Thus, operation 711 may be performed for service daemon 321A transparent to operation of other service daemons 321 running within SCSI target processor 116.

By flagging service daemon 321A to be shutdown at a later time, method 700 in conjunction with SCSI target management daemon 340 perform a delayed shutdown that allows services daemon 321A to be shutdown when resources are available to process the request.

As discussed above, methods 400-700 manage service daemon 321A using SCSI target management daemon 340. SCSI target management daemon 340 may similarly operate to configure other service daemons 321 in SCSI target processor 116. Accordingly, SCSI target management daemon 340 may manage each service daemon 321 with consideration and knowledge of other service daemons 321 on SCSI target processor 116. This unified system eliminates potential conflicts during service daemon 321 setup and shutdown as SCSI target management daemon 340 is aware of these potential conflicts.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method executed by a Small Computer System Interface (SCSI) target device for managing delayed shutdown of a service daemon corresponding to a first data storage service provided by the SCSI target device, the method comprising:
    detecting, by a SCSI target management daemon, a first service daemon is to be shut down; and
    setting, in response to detecting that the first service daemon is to be shut down, a delay flag for the first service daemon, indicating that the first service daemon is to be shut down when resources are available to shut down the first service daemon; and
    detecting, by a thread of the SCSI target management daemon, that the delay flag of the first service daemon is set; and
    determining, by the thread of the SCSI target management daemon in response to detecting the delay flag of the first service daemon is set, whether resources are available to shut down the first service daemon and in response to detecting that resources are available to shut down the first service daemon:
        disabling, by the thread of the SCSI target management daemon, receipt of new SCSI commands by a virtual driver for the first service daemon within an operating system kernel of the SCSI target device, and
        removing configuration data from the operating system kernel of the SCSI target device for the first service daemon.

2. The computer implemented method of claim 1, wherein the first service daemon and the SCSI target management daemon are separate processes running on the SCSI target device.

3. The computer-implemented method of claim 1, wherein removing the configuration data for the first service daemon includes removing logical unit numbers (LUNs) and access groups associated with the first service daemon from the operating system kernel.

4. The computer-implemented method of claim 1, wherein the first service daemon is assigned to at least one transport port used for communication with one or more host initiators that is shared with a second service daemon that processes commands for a second data storage service.

5. The computer-implemented method of claim 4, wherein removing configuration data of the first service daemon is transparent to operation of the second service daemon.

6. The computer-implemented method of claim 1, wherein the thread of the SCSI target management daemon operates at a periodic interval to detect whether the delay flag of the first service daemon is set and determining whether resources are available to shut down the first service daemon.

7. The computer-implemented method of claim 6, wherein the periodic interval is sixty seconds.

8. A small computer system interface (SCSI) target device, comprising:
- a first daemon corresponding to a data storage service offered by the SCSI target device;
- a SCSI target management daemon, wherein the first service daemon and the SCSI target management daemon are separate processes running on the SCSI target device, the SCSI target management daemon configured to:
  - detect the first service daemon is to be shut down, and
  - set, in response to detecting that the first service is to be shut down, a delay flag for the first service daemon, indicating that the first service daemon is to be shut down when resources are available to shut down the first service daemon; and
- a thread of the SCSI target management daemon that is configured to
  - detect that the delay flag of the first service daemon is set, and
  - determine, in response to detecting the delay flag of the first service daemon is set, whether resources are available to shut down the first service daemon; and
- a SCSI processor configured to execute the first service daemon and the SCSI target management daemon within the SCSI target device.

9. The SCSI target device of claim 8, wherein the thread of the SCSI target management daemon is further configured to:
- disable receipt of new SCSI commands by a virtual driver for the first service daemon within an operating system kernel of the SCSI target device; and
- remove configuration data from the operating system kernel of the SCSI target device for the first service daemon.

10. The SCSI target device of claim 9, wherein removing the configuration data for the first service daemon includes removing logical unit numbers (LUNs) and access groups associated with the first service daemon from the operating system kernel.

11. The SCSI target device of claim 9, wherein the first service daemon is assigned to at least one transport port used for communication with one or more host initiators that is shared with a second service daemon that processes commands for a second data storage service.

12. The SCSI target device of claim 11, wherein removing configuration data of the first service daemon is transparent to operation of the second service daemon.

13. The SCSI target device of claim 8, wherein the first service daemon and the SCSI target management daemon are separate processes running on the SCSI target device.

14. The SCSI target device of claim 8, wherein the thread of the SCSI target management daemon operates at a periodic interval to detect whether the delay flag of the first service daemon is set and determining whether resources are available to shut down the first service daemon.

15. The SCSI target device of claim 14, wherein the periodic interval is sixty seconds.

16. A non-transitory computer-readable storage medium having instructions stored therein, which when executed by a Small Computer System Interface (SCSI) target device, cause the SCSI target device to perform operations for managing delayed shutdown of a service daemon corresponding to a data storage services provided by the SCSI target device, the operations comprising:
- detecting, by a SCSI target management daemon, a first service daemon is to be shut down; and
- setting, in response to detecting that the first service daemon is to be shut down, a delay flag for the first service daemon, indicating that the first service daemon is to be shut down when resources are available to shut down the first service daemon; and
- detecting, by a thread of the SCSI target management daemon, that the delay flag of the first service daemon is set; and
- determining, by the thread of the SCSI target management daemon in response to detecting the delay flag of the first service daemon is set, whether resources are available to shut down the first service daemon and in response to detecting that resources are available to shut down the first service daemon:
  - disabling, by the thread of the SCSI target management daemon, receipt of new SCSI commands by a virtual driver for the first service daemon within an operating system kernel of the SCSI target device, and
  - removing configuration data from the operating system kernel of the SCSI target device for the first service daemon.

17. The non-transitory computer-readable storage medium of claim 16, wherein the first service daemon and the SCSI target management daemon are separate processes running on the SCSI target device.

18. The non-transitory computer-readable storage medium of claim 16, wherein removing the configuration data for the first service daemon includes removing logical unit numbers (LUNs) and access groups associated with the first service daemon from the operating system kernel.

19. The non-transitory computer-readable storage medium of claim 16, wherein the first service daemon is assigned to at least one transport port used for communication with one or more host initiators that is shared with a second service daemon that processes commands for a second data storage service.

20. The non-transitory computer-readable storage medium of claim 19, wherein removing configuration data of the first service daemon is transparent to operation of the second service daemon.

21. The non-transitory computer-readable storage medium of claim 16, wherein the thread of the SCSI target management daemon operates at a periodic interval to detect whether the delay flag of the first service daemon is set and determining whether resources are available to shut down the first service daemon.

22. The non-transitory computer-readable storage medium of claim 21, wherein the periodic interval is sixty seconds.

* * * * *